No. 683,638. Patented Oct. 1, 1901.
G. H. CLARK.
WHEEL TIRE.
(Application filed Mar. 2, 1901.)

(No Model.)

Witnesses:
H. B. Davis
John W. Decrow

Inventor:
George H. Clark.
by B. J. Noyes
atty

UNITED STATES PATENT OFFICE.

GEORGE H. CLARK, OF BOSTON, MASSACHUSETTS.

WHEEL-TIRE.

SPECIFICATION forming part of Letters Patent No. 683,638, dated October 1, 1901.

Application filed March 2, 1901. Serial No. 49,552. (No model.)

*To all whom it may concern:*

Be it known that I, GEORGE H. CLARK, of Boston, in the county of Suffolk and State of Massachusetts, have invented an Improvement in Wheel-Tires, of which the following description, in connection with the accompanying drawings, is a specification, like letters on the drawings representing like parts.

This invention relates to rubber wheel-tires of that class having an outer covering of rubber inclosing a core of some suitable substance, as sponge-rubber, felt, hemp, or the like. Heretofore difficulty has been experienced with tires of this class, because owing to their extensibility they could be easily sprung off the wheel-rim accidentally, and to obviate this difficulty a longitudinal non-extensible strip has been incorporated between the core and covering; but while such a strip reduced the extensibility of the tire to such a degree as to obviate the difficulty above mentioned, yet in practice it is difficult to spring such a tire onto any but rims having very narrow flanges, and from which consequently the tire can be easily displaced accidentally.

The object of this invention is to construct a tire of this class in which is incorporated a non-extensible strip and which can be sprung onto a wheel-rim with flanges of considerable width.

In accordance with this invention I employ an outer covering, an inner core surrounded or inclosed thereby, and a non-extensible strip incorporated between the outer periphery of said core and said outer covering running lengthwise entirely around said tire. On the inner or rim side of said core, which may or may not be of an extensible substance, are cut transverse slits, extending from edge to edge of said side and extending to a sufficient depth, preferably obliquely to the length of said core, to provide for an extension of the rim side of the covering by thus constructing the core in such a manner that its rim side may be extended.

Figure 1:
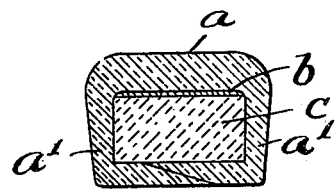
Figure 2:
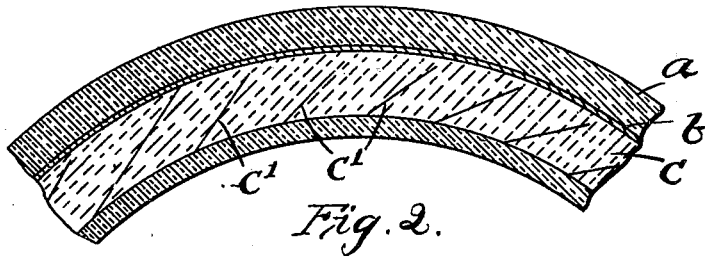
Figure 3:
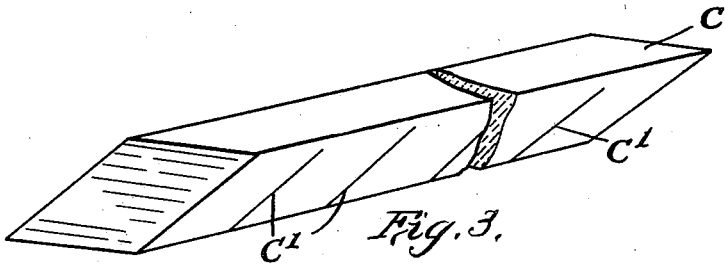
Figure 4:
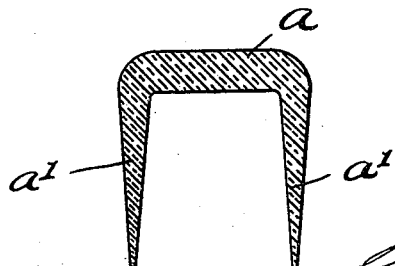

Figure 1 is a cross-section of a tire embodying this invention. Fig. 2 is a longitudinal section of a portion of the tire. Fig. 3 is a perspective view of the core. Fig. 4 is a cross-section of an outer covering which may be employed.

The outer covering (shown in cross-section in Fig. 4) comprises, essentially, a tread portion $a$ and side portions $a'$ $a'$. To the inner or rim side of said tread portion $a$ is valcanized or otherwise securely fastened a strip of non-extensible material, as $b$, preferably canvas, and which extends longitudinally the entire length of the tire and which is or may be wide enough to fit snugly between said side portions $a'$ $a'$.

$c$ is a core of suitable material—such as sponge-rubber, felt, hemp, or the like—and which so far as my invention is concerned may be inherently extensible or non-extensible. Said core is or may be formed substantially rectangular in cross-section and of a suitable width to fit snugly between the side portions $a'$ $a'$ of the covering and of a thickness corresponding to the desired thickness of the tire. On the inner or rim side of said core $c$ are cut transverse slits, as $c'$ $c'$, said slits extending from edge to edge of said side and also extending to a considerable depth, preferably in a direction oblique to the length of said core. Said core $c$ is placed between said side pieces, with its outer side abutting said non-extensible strip $b$, and the projecting ends of said side pieces are folded over and lapped on said slitted side of said core $c$, as shown in Fig. 1, and the parts are thus vulcanized or otherwise securely fastened together. It will therefore be seen that by the employment of said slitted core $c$, while not substantially enlarging the outer or tread diameter of the tire, the inner or rim diameter may be enlarged sufficiently to enable said tire to be sprung onto a wheel-rim having very wide flanges, from which, owing to the non-extensible qualities of its outer or tread portion, it is practically impossible to accidentally displace it.

I do not limit myself to the material which I may employ for the core $c$, as there are several, any one of which may be used, nor does it matter, so far as the spirit and scope of my invention is concerned, whether said material is extensible or non-extensible.

I claim—

A wheel-tire having an outer covering, a non-extensible strip on the inner side of the tread portion of said covering, and a core contained in said outer covering, the rim side of which is slitted transversely from edge to edge to provide for extensibility of the rim side of the tire, substantially as described.

In testimony whereof I have signed my name to this specification in the presence of two subscribing witnesses.

GEORGE H. CLARK.

Witnesses:
B. J. NOYES,
JOHN W. DECROW.